Nov. 9, 1926. 1,606,479
R. MIDGLEY
INTERNAL COMBUSTION ENGINE
Filed Jan. 25, 1926  2 Sheets-Sheet 1

Inventor
ROY MIDGLEY,
By Townshend & Townshend
Attorneys

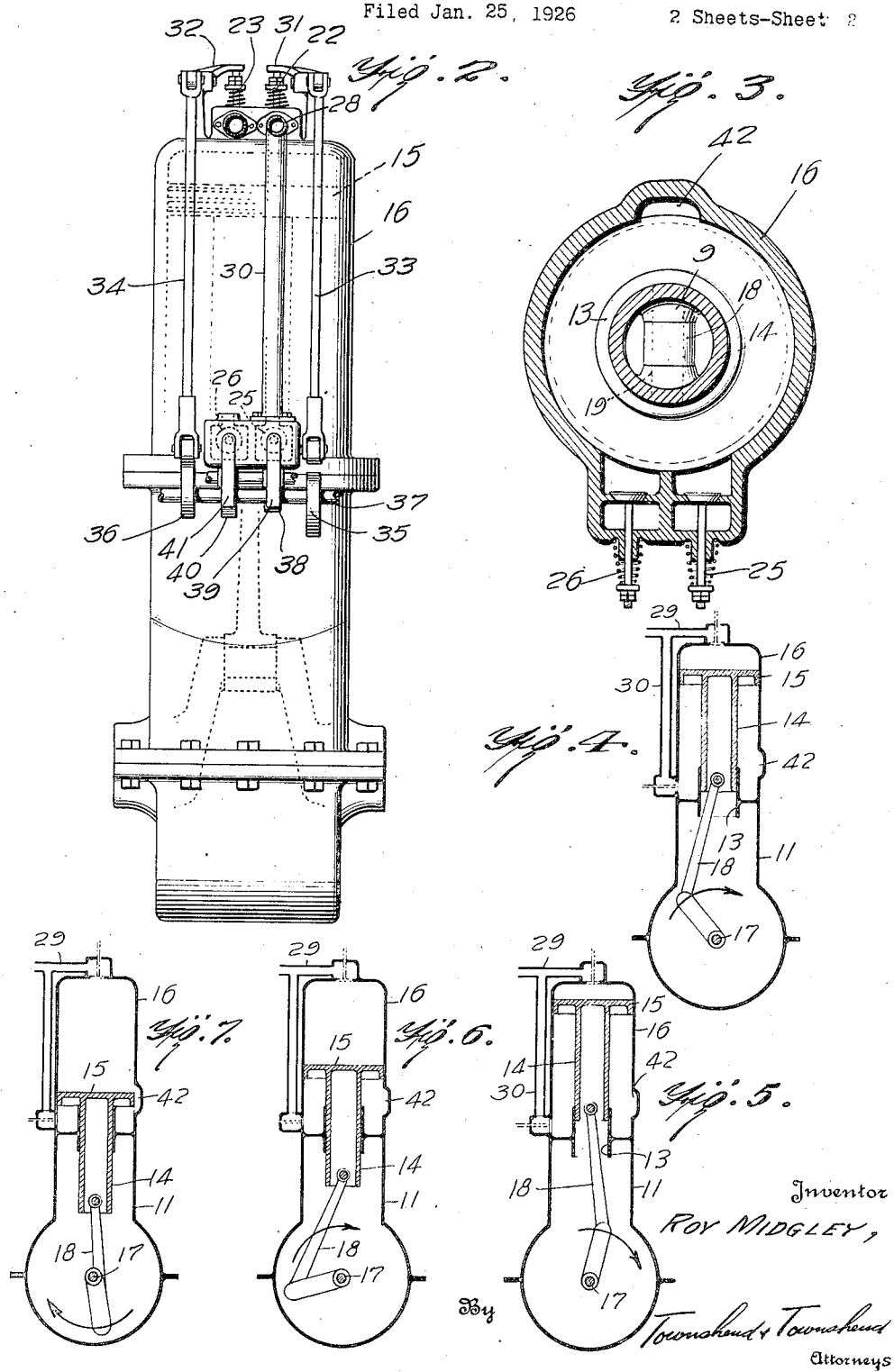

Patented Nov. 9, 1926.

1,606,479

UNITED STATES PATENT OFFICE.

ROY MIDGLEY, OF MOUNT DORA, FLORIDA.

INTERNAL-COMBUSTION ENGINE.

Application filed January 25, 1926. Serial No. 83,577.

My invention relates to internal combustion engines, the primary object thereof being the provision of an improved construction of an internal combustion engine having a self contained air and fuel compressor. Another object of the invention is to provide in an internal combustion engine air pressure means for scavenging exhaust gases from the engine cylinder. A still further object of the invention resides in the provision of a novel and improved fuel feed and valve arrangement for internal combustion engines.

With these objects in view and such others as will be apparent from the description, my invention resides in the novel combination, construction, and arrangement of parts hereinafter described and claimed, and illustrated in the accompanying drawings of which:—

Figure 2 is a side elevation thereof, as from the left of Figure 1;

Figure 3 is a horizontal section on the line 3—3 of Figure 1;

Figure 1:
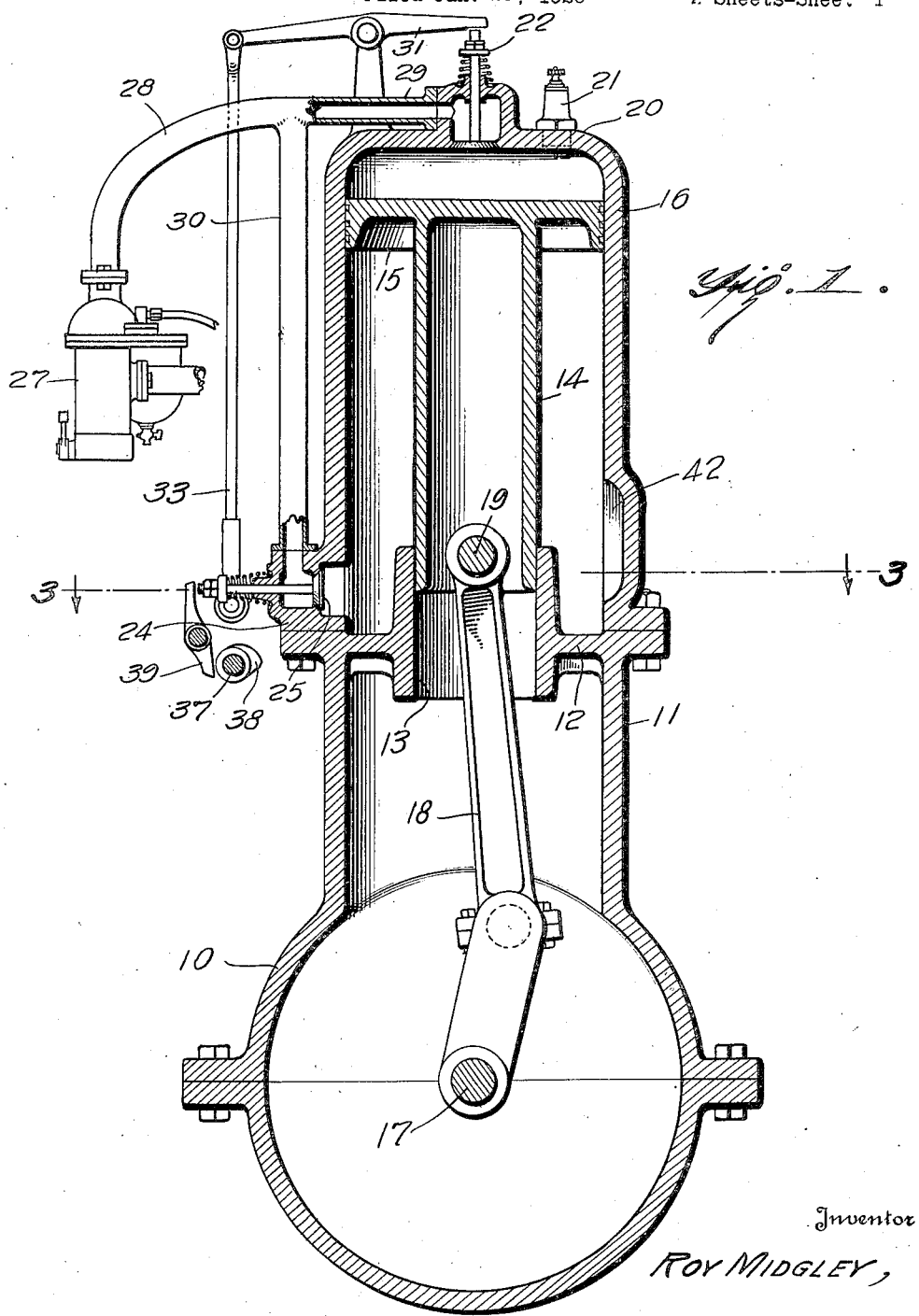
Figure 1 is a central vertical section through an engine constructed in accordance with the principles of the invention.

Figures 4, 5, 6, and 7 are reduced vertical sections through an engine illustrating the cycle of operations.

In detail, the engine comprises a crank case 10 provided with an upstanding throat 11 partially closed at its upper end by an annular web 12 provided at its center with a vertically extending enlarged bearing sleeve 13 through which is guided for vertical movement the depending skirt 14 of a piston 15 operating in a casing 16 suitably secured over the crank case throat 11 and annular web 12.

The piston 15 is operated from the piston crank shaft 17 through the medium of a conventional connecting rod assembly 18 in connection with a wrist pin 19 mounted in the lower end of the depending skirt 14 of the piston. The head 20 of the engine cylinder has disposed therein the usual spark plug 21 for igniting the fuel charge, and contains in addition an intake valve 22 and an exhaust valve 23 arranged in the head in the conventional manner of overhead valve assembly.

The wall of the engine cylinder adjacent its bottom is formed with a lateral valve head 24 containing a pair of inwardly opening valves 25 and 26. A fuel discharge is supplied to the engine cylinder from the carbureter 27 through an intake manifold 28 having two branches 29 and 30, the upper branch 29 communicating with the intake valve 22 and the lower branch 30 communicating with the valve 25 whereby the engine cylinder is provided with fuel inlet ports at opposite ends thereof.

The valve 26 at the lower end of the engine cylinder is arranged for communication with the atmosphere so that air may be drawn into the cylinder at its lower end when the valve is open. The intake valve 22 and exhaust 23 in the cylinder head are operated by rocker arms 31 and 32 respectively, which are actuated by push rods 33 and 34 respectively, the movements of which are controlled by cams 35 and 36 secured to a cam shaft 37 disposed adjacent the valve assembly in the lower end of the engine cylinder, and having operative connection with the engine crank shaft. A cam 38 carried by the cam shaft actuates a rocker arm 39 in timed relation for depressing the stem of the valve 25 for opening and closing said valve, while the valve 26 is similarly operated through the medium of a cam 40 on the shaft 37 engaging a valve operating rocker arm 41. The wall of the cylinder 16, opposite the valves 25 and 26 is provided with a by pass 42 providing communication between the lower end of the cylinder and the interior thereof around the piston 15 when the piston is in lowermost position.

The cams are so arranged upon the cam shaft that the two sets of valves will be operated in timed relation to the travel of the piston for accomplishing the following operations. With the parts in position as illustrated in Figure 1 it is assumed that the piston is at the top of the cylinder on the commencement of the power stroke, the explosive charge having been fired by the spark plug 21. During the upward travel of the piston preparatory to its downward movement on the power stroke, the valve 26 is opened to allow air to be sucked into the lower end of the engine cylinder behind the piston 15. On downward movement of the piston on the power stroke valve 26 closes and valve 25 remains closed so that the air taken into the cylinder is compressed by the piston so that as the piston in its downward movement to the dotted line position shown in Figure 1 clears the by pass 42 the compressed air will be discharged into the cylinder, scavenging the cylinder of all exhaust gases contained therein, out through the open exhaust valve. On the upstroke of the piston the discharge of the burned gas in the top of the cylinder is completed and the valve 25 is opened to permit live gas being taken into the lower end of the cylinder behind the piston. As the piston reaches its top center valve 25 closes and the intake valve 22 opens, valves 26 and 23 remaining closed. As the piston starts down on the intake stroke the gas in the lower end of the cylinder is compressed and as the piston reaches its bottom center clearing the by pass 42 the compressed gas is discharged into the interior of the cylinder in addition to the gas taken in through the intake valve 22, forming an additional supply to be compressed on the upstroke of the piston.

It will be apparent that an engine constructed in accordance with the present invention, is provided with plural intake means whereby a maximum amount of fuel gas is fed to the cylinder and compressed therein. The construction of the web 12 at the bottom of the cylinder in conjunction with the assembly of the valves 25 and 26, acts with the piston 15 to form an efficient compressor in the lower end of the cylinder for discharge into the interior of the cylinder as the piston reaches its bottom center. The discharge of air into the cylinder after the power stroke forms a positive scavenging means for expelling burned gases from the interior of the cylinder. While in this preferred embodiment of the invention I have illustrated and described certain details entering into the construction and operation thereof, I desire it to be understood that the invention is not to be limited thereby, but that any desired changes and modifications may be made in the details thereof as will fall within the scope of the invention as claimed.

I claim:—

1. In an internal combustion engine, a cylinder having fuel intake and exhaust valves in the head thereof, an annular web formed in the bottom of said cylinder to close the same, a bearing sleeve formed through said web, a piston in said cylinder, a depending skirt on said piston and slidable through said sleeve, a fuel intake valve in the wall of the cylinder above said web, an air inlet valve in the wall of the cylinder above said web, a common means for operating all of said valves in timed relation, and a by pass in the cylinder wall opposite the valves adjacent said web, for discharging alternately compressed fuel and air from beneath said piston to the interior of the cylinder.

2. In an internal combustion engine, a cylinder having fuel intake and exhaust valves in the head thereof, an annular web formed in the bottom of said cylinder for closing the lower end thereof, said web having a bearing sleeve formed integral therewith and centrally therethrough, a piston in said cylinder, a depending cylindrical skirt on said piston and slidable through said sleeve, a fuel intake valve in the wall of the cylinder directly above said web, an air inlet valve in the wall of the cylinder directly above said web, a common cam shaft controlled means for operating all of said valves in timed relation, said cylinder wall being formed with an integral by-pass disposed at the bottom of the cylinder and opposite the valves adjacent said web, for disposing fuel and air alternately compressed between said piston and web to the interior of the cylinder.

In testimony whereof I have affixed my signature.

ROY MIDGLEY.